United States Patent Office 2,974,167
Patented Mar. 7, 1961

2,974,167

ACTIVE DERIVATIVES OF THE TETRACYCLINE ANTIBIOTICS

Charles R. Stephens, Jr., Niantic, Conn., assignor to Chas. Pfizer & Co., Inc., Brooklyn, N.Y., a corporation of Delaware No Drawing. Filed Feb. 26, 1958, Ser. No. 717,554

10 Claims. (Cl. 260—559)

This invention is concerned with a group of new biologically active tetracycline antibiotic compounds and with the process for the preparation of these compounds.

The so-called "tetracycline antibiotics," which include oxytetracycline (also known by the register trademark "Terramycin"), chlortetracycline (known by the trademark "Aureomycin"), and tetracycline (known by the trademark "Tetracyn"), possess a common type of structure, that is, each of these compounds has a hydronaphthacene ring system, highly substituted with oxygen-containing groups and other substituents. In addition, certain derivatives of these compounds, such as the des-dimethylamino derivatives, the 5a-6 anhydro compounds, the 5a-6-anhydrodesdimethylamino compounds, and monoesters of these antibiotic compounds with a variety of organic acids, such as the acetate, propionate, phthalate, maleate, and succinate esters, as well as various salts including the acid addition and metal salts, have been prepared and found to be biologically active. The acid addition and metal salts include salts with mineral acids such as hydrochloric, sulfuric, and phosphoric acids; salts with strong organic acids such as p-toluenesulfonic acid; and such materials as the sodium, potassium, barium, and calcium salts. All of these compounds will be referred to herein as "tetracycline antibiotics" or "tetracycline antibiotic compounds."

It has now been found that certain highly active aldehydes and ketones are capable of combining with the tetracycline antibiotics to yield new biologically active substances which have certain advantages in their higher solubility in water at slightly basic pH's. The exact point of attachment of the carbonyl compound to the tetracycline antibiotic compounds has not been established definitely, but there is some evidence for addition at the carboxamido group. However, this is not conclusive. At any rate, it is known that the valuable products of this invention are distinct chemical compounds and are 1:1 adducts of the antibiotic compound with the carbonyl compound, i.e. the active aldehyde or ketone. In other words their compositions correspond to a combination of one molecule of antibiotic with one molecule of carbonyl compound. Their empirical formulas can be obtained by totaling the empirical formulas of the two components. The products of this invention which are adducts of the antibiotics themselves, i.e., tetracycline, oxytetracycline, chlortetracyline, the esters thereof, and the acid addition and metal salts thereof, constitute preferred embodiments of the invention.

The highly active carbonyl compounds, that is the aldehydes and ketones, which are employed for the formation of the new compounds of the present invention are those which are substituted on the carbonyl carbon atom with at least one activating group. By activating group is meant any strongly electronegative group which renders the carbonyl carbon atom more strongly positive than in a carbonyl compound that is only substituted by saturated organic groups. Aldehydes and ketones of this type have a number of properties in common. For example, they have unusually strong electrophillic properties. That is, they react with the common carbonyl reagents such as phenylhydrazine, semicarbazine, hydroxylamine, etc. with unusual facility. Many of them have the further property of forming stable hydrates. Examples of such carbonyl compounds include chloral, bromal, glyoxal, biacetyl, pyruvaldehyde, phenylglyoxal, 1,2,3-indanetrione, 5-nitrofurfural, acyl cyanides such as acetyl cyanide and benzoyl cyanide, N-oxides of α-formyl heterocyclic compounds such as 2-methyl-3-formyl-quinoxaline-1,4-dioxide. The following groups are therefore classified as electronegative and have the property of rendering an aldehyde or ketone carbonyl strongly positive thereby enabling it to react in the process of the present invention: —CHO, —CCl₃, —CBr₃, —COOH, —COOR, —COR, —CN,

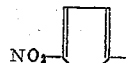

and

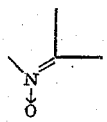

etc. Many other electronegative groups of a similar nature are described in texts on organic chemistry. All have the property of strongly attracting electrons. In the above series, R is a hydrocarbon group having from one to twelve carbon atoms. Examples of such groups include alkyl groups such as methyl, ethyl, butyl, and octyl; alkenyl groups such as allyl, methallyl, and hendecenyl; aralkyl groups such as benzyl, xylyl, and naphthylenemethyl; and aryl groups such as phenyl, naphthyl, tolyl, etc. It is also, of course, necessary to avoid use of the group which will considerably increase the toxicity of the antibiotic. In particular, chloral, glyoxal, 1,2,3-indanetrione, 5-nitrofurfural, 2-methyl-3-formylquinoxaline-1,4-dioxide have proven to be especially useful.

At least one of the substituents attached to the carbonyl carbon atom of the type of highly active carbonyl compound useful in the process of this invention is an activating group of the sort just described. With the aldehydes the remaining carbonyl-attached group is, of course, a hydrogen atom. With the ketones the other carbonyl attached group is sometimes a second activating group of the type referred to above. This is the case with 1,2,3-indanetrione. In other instances it is an unreactive organic residue such as a substituted or unsubstituted one to twelve carbon atom hydrocarbon group. Examples of substituent groups with which the one to twelve carbon atom hydrocarbon group may be substituted include esters, ethers, sulfides, disulfides, nitro groups, and nitrile groups. Ketones in which one carbonyl-attached substituent is a hydrocarbon group and the other is an electronegative or activating group are exemplified by ethyl pyruvate, ethyl phenylpyruvate, and diacetyl. Ketones containing an unreactive organic residue of the substituted hydrocarbon type as the second carbonyl-attached substituent include diethyl oxaloacetate, and ethyl p-nitrophenylpyruvate.

Preferred active carbonyl compounds for the process of the present invention are those in which one of the carbonyl attached groups is an electronegative activating group as already described and the remaining carbonyl-attached substituent is selected from the group consisting of hydrogen, hydrocarbon groups having one to twelve carbon atoms, and activating groups as defined above. It is further preferred that said active carbonyl compound contain a maximum of about fourteen carbon atoms.

In general, the process of the present invention is conducted by contacting the tetracycline antibiotic compound in an inert organic solvent (in which the two reactants are at least moderately soluble) with at least about one molecular proportion of the active carbonyl compound, for instance, two or three molecular proportions may be used, but there is no great advantage to using a substantially higher proportion of carbonyl compound. Although it is preferred to utilize anhydrous reagents and solvents, a moderate amount of water does not necessarily impede the process. Various solvents may be utilized for conducting the process, as long as these are inert to the reagents used and to the product that is formed. Dioxane is quite suitable as are certain other ethers, e.g. tetrahydrofuran.

In general, the reaction may be conducted at about room temperature, that is, from about 15° to about 25° C., although in certain cases conducting the reaction at an elevated temperature, that is, up to about 85° C., is not deleterious. In general, the rate of the reaction depends somewhat upon the temperature at which it is conducted. When room temperature is utilized, it may take a number of hours, that is, up to about 100 hours, to complete the reaction. The product may be recovered from the reaction mixture by removing the solvent at a temperature that is not so high as to cause decomposition of the product. If the carbonyl compound that is used is volatile, this may also be removed by distillation from the product which has a very low volatility. In some cases it is possible to crystallize the product by dissolving it in a suitable solvent and carefully concentrating, or by adding a second solvent in which the product is appreciably less soluble.

As indicated above, the products of the present invention possess appreciable biological activity against a variety of pathogenic microorganisms. Furthermore, these compounds have certain advantages over the parent antibiotic compounds in that they are more soluble in water at slightly basic pH's than are the parent compounds. The toxicity of the new derivatives, when a suitable highly active carbonyl compound is chosen for addition to the tetracycline antibiotic compound, is not appreciably higher than that of the tetracycline antibiotics themselves. Thus, the chloral adduct of oxytetracycline has an $LD_{50}$ in mice by the intravenous route of 140 milligrams per kilogram. Orally the value is greater than 4000 milligrams per kilogram.

It has been established that these products result in appreciable antibiotic activity in the blood serum over a considerable period after administration by the intramuscular route. In the following table are summarized the blood levels in rabbits overserved periodically during a period of 24 hours following intramuscular injection of 100 mg./kg. of the oxytetracycline-chloral compound. The first sample was administered as a solution in dilute sodium bicarbonate solution and the second in dilute potassium bicarbonate solution. Comparison is made with oxytetracycline hydrochloride administered in exactly the same manner and at the same level.

|  | Blood Level (mcg./ml.) | | | | | |
| --- | --- | --- | --- | --- | --- | --- |
| Hours | 0 | 1 | 3 | 5 | 7 | 24 |
| Oxytetracycline-chloral in $NaHCO_3$ | 0 | 1.3 | 1.5 | 1.4 | 1.1 | 0.5 |
| Oxytetracycline-chloral in $KHCO_3$ | 0 | 2.3 | 2.1 | 2 | 1.8 | 0.4 |
| Oxytetracycline Hydrochloride | 0 | 3.7 | 2.1 | 1.8 | 1.1 | 0.78 |

It should be noted that the products formed by the present reaction possess a further new assymetric carbon atom when an unsymmetrical carbonyl compound as defined herein is used due to conversion of the carbonyl group to a carbinol with a carbon atom substituted with four different groups. Therefore, these products exist in two different diasterioisomeric forms. These forms of the compounds may, in some cases, be separated. However, in the usual case, both forms are biologically active (although one may be more active than the other) and, accordingly, it is not essential that they be separated before use. In many cases, it is possible to obtain the products in crystalline form, but again, this is not essential since the crude, non-crystalline materials are also useful.

The products of the present invention may be incorporated with various suitable pharmaceutical carriers in dosage forms which are of value for administration to animals in the treatment of a variety of infections. Essentially any inert pharmaceutical carrier may be used, that is, any substance which is useful for the preparation of dosage forms and which does not tend to inactivate the antibiotic substance. Thus, the carbonyl compound addition products may be incorporated into capsules with various inert materials or these compounds may be converted into tablets by incorporation with certain tableting agents, such as gums, either natural or synthetic, sweetening agents, coating agents and so forth. Alternatively, the products of the present invention may be utilized in the form of injectable preparations. For administration by the intramuscular route, the medium for the active compounds may be water, saline, non-toxic vegetable oils, and other materials of this nature. For administration by the intravenous route, care must be taken to make certain that a clear solution in water, saline, or glucose solution is prepared. It should be noted that, upon prolonged storage in aqueous solution, the antibiotic activity may be lost to an appreciable extent and there may be a tendency for solid materials to separate. Certain other dosage forms, such as ointments or salves, may be prepared with a suitable base, preferably a non-hydrophilic base, such as petroleum jelly and substances of this nature.

This application is a continuation-in-part of my co-pending application Serial No. 566,764, filed February 21, 1956, which in turn is a continuation-in-part of Serial No. 487,457, filed February 10, 1955, and now abandoned.

The following examples are given by way of illustration, and are not to be regarded as limitations of this invention, many variations of which are possible without departing from the spirit or scope thereof.

*Example I*

A mixture of 9.2 grams (0.02 mole) of anhydrous, amphoteric oxytetracycline and 5.0 cc. (0.05 mole) of anhydrous chloral in 100 mls. of anhydrous dioxane was placed in an Erlenmeyer flask and stoppered. The mixture was shaken for two days at room temperature. It was then transferred to a round-bottomed flask and the mixture was frozen in Dry Ice. The solvent and excess reagent was removed under vacuum from the frozen state. The residual material in the flask was dissolved in 50 ml. of methanol at room temperature. When the walls of the flask beneath the surface of the liquid were rubbed with a glass rod, a crystalline product separated. This was filtered and dried. It weighed 3.4 grams. This is one diasterioisomeric form of the reaction product of chloral and oxytetracycline.

The solution from which the crystalline product had been filtered was concentrated under vacuum to obtain 6.6 grams of solid amorphous material. The product was crystallized by dissolving it in hot dioxane and cooling. The first product above is referred to as "A" and the second is "B." The latter had a biological activity corresponding to 150 mcg./mg. of oxytetracycline in a standard microbiological assay. These materials differ in infrared absorption, optical rotation and in the level of their biological activity.

Form "A" was recrystallized two times from methanol and had the following properties:

Analysis.—Calcd. for $C_{24}H_{25}N_2O_{10}Cl_3$: C, 47.5; H, 4.1; N, 4.61; Cl, 17.5. Found: C, 47.3; H, 4.5; N, 4.9; Cl, 16.7. $(\alpha)_D^{25}$—108° (C=1% in acetone, 0.1 N in HCl). Titration in dimethylformamide-water mixture indicated the presence of two salt-forming groups with $pK'a$ values of 8.2 and 10.0. The neutral equivalent from the titration was 604. The calculated molecular weight is 607. This product had a biological activity of 400 mcg./ml. when assayed by the standard *Klebsiella pneumoniae* turbidimetric test. It was found that the product is more active against *Endamoeba histolytica* than is an equal amount of oxytetracycline.

Example II

Two grams of anhydrous oxytetracycline and two grams of glyoxal were placed in 200 cc. of diethyl ether. The mixture was shaken for 30 hours at room temperature. The mixture was then evaporated under vacuum to dryness. Excess glyoxal was distilled out at a low pressure. The product was found to be biologically active against a variety of Gram-positive and Gram-negative microorganisms.

Example III

The process described in Example I was repeated utilizing tetracycline in place of oxytetracycline. The product was isolated as a crude mixture of diasterioisomeric forms and shown to be highly active as an inhibitor of microorganisms.

Example IV

The process described in Example I was repeated utilizing an equivalent weight of chlortetracycline rather than oxytetracycline. The crude product was isolated in solid form. It showed a high level inhibitory action against a variety of microorganisms.

Example V

A mixture of 0.02 mole of anhydrous amphoteric oxytetracycline and 0.05 mole of anhydrous bromal in 100 ml. of anhydrous dioxane was shaken at room temperature in an Erlenmeyer flask for two days. The solution was then frozen and dried in vacuo from the frozen state leaving an amorphous residue. This residue proved to be a mixture of the diasterioisomeric forms of the bromal adduct of oxytetracycline. Titration of a sample of this material in dimethyl-formamide-water indicated a neutral equivalent of 760 for the product, which is good agreement with the calculated value of 741.

Example VI

Anhydrous amphoteric oxytetracycline, 2.3 g. (0.005 mole), and 1.4 g. (approximately 0.008 mole) of 1,2,3-indanetrione hydrate was dissolved in 20 ml. of dry dioxane and the solution heated for one hour at 50-60° in a sealed glass tube. The mixture was cooled, frozen in solid carbon dioxide, and dried in vacuo from the frozen state. The excess ketone was separated from the crude product so obtained by washing with water. The remaining crystalline material was the 1,2,3-indanetrione adduct of oxytetracycline. It was soluble in aqueous sodium bicarbonate and exhibited a bio-potency of 300 mcg./mg. when assayed by the standard *Klebsiella pneumoniae* turbidimetric test. It should be noted that in this case diasterioisomerism is not possible since a symmetrical carbonyl compound is employed.

In an analogous fashion diacetyl, acetyl cyanide, ethyl phenylpyruvate, diethyl oxaloacetate, ethyl 4-nitrophenylpyruvate, pyruvaldehyde, phenylglyoxal, benzoyl cyanide and ethyl pyruvate were condensed with oxytetracycline and products with a similar level of biological activity were obtained. These products were mixtures of the two diasterioisomeric forms.

Example VII

Anhydrous oxytetracycline, 9.2 g. (0.02 mole), and 5-nitrofurfural 4.23 g. (0.03 mole) were dissolved in 100 ml. of dry dioxane. The mixture was shaken at room temperature for 72 hours and evaporated to dryness in vacuo in a rotating evaporator. The residual gum was triturated with anhydrous ether and allowed to stand at room temperature for 3 hours. The solid material was collected, washed with anhydrous ether and the trituration process repeated. The resulting amorphous buff-colored product weighed 10.6 g. It was further purified by dissolving in acetone and pouring the resulting solution into several volumes of hexane.

Analysis.—Calcd. for $C_{27}H_{27}O_{13}N_3$: C, 53.91; H, 4.53; N, 6.98. Found: C, 53.99; H, 4.84; N, 6.57.

This product has a much higher solubility in acetone, methanol, ethanol, and dioxane than anhydrous oxytetracycline. The absence of light absorption at 5.90µ in the infrared region of the spectrum indicates that the 5-nitrofurfural is chemically bound through its carbonyl group. The product when dissolved in 0.01 N methanolic hydrochloric acid at a concentration of 1% exhibits absorption maxima in the ultra-violet at 271, 310, and 355 mµ with extinction values of ϵ=20,200, 17,200, and 15,600 respectively. The bathochromic shift of the short wave length maxima of oxytetracycline from 266 mµ to 271 mµ as is observed in this product is characteristic of the other adducts in this series. This material when assayed by the *Klebsiella pneumoniae* oxytetracycline assay exhibits activity corresponding to about 750 mcg. of oxytetracycline per milligram. It is active against a wide variety of bacteria and fungi.

Example VIII

The process of Example VII is repeated substituting tetracycline for oxytetracycline employing the same molecular quantities of reagents. Again, the product is a 1:1 adduct and exhibits no absorption in the infrared region of the spectrum in the 6µ vicinity. It exhibits absorption maxima in the ultraviolet when dissolved in 0.01 N methanolic hydrochloric acid at 271, 306, and 357 mµ with extinction values of ϵ=20,500, 13,800, and 14,500 respectively. It exhibits solubility characteristics similar to the 1:1 oxytetracycline 5 nitrofurfural adduct and a *Klebsiella pneumoniae* assay corresponding to about 300 mcg. of tetracycline per milligram.

Example IX

The process of Example VII is applied to 2-methyl-3-formyl-quinoxaline-1,4-dioxide with the production of the corresponding 1:1 adduct of oxytetracycline.

What is claimed is:

1. The process which comprises reacting in a substantially non-aqueous inert solvent a tetracycline antibiotic selected from the group consisting of tetracycline, oxytetracycline, chlortetracycline, the mineral acid addition salts thereof, the p-toluenesulfonic salts thereof, the alkali metal salts thereof, the calcium salts thereof, and the barium salts thereof with at least one molecular proportion of a carbonyl compound to obtain the 1:1 adduct of said tetracycline antibiotic and said carbonyl compound, said carbonyl compound being selected from the group consisting of chloral, glyoxal, bromal, 1,2,3-indanetrione, diacetyl, acetyl cyanide, ethyl pyruvate, pyruvaldehyde, benzoyl cyanide, phenylglyoxal, ethyl phenylpyruvate, diethyl oxaloacetate, ethyl 4-nitrophenylpyruvate, 5-nitrofurfural, and 2-methyl-3-formylquinoxaline-1,4-dioxide, the temperature of reaction being from about 15° to about 85° C. and the time of reaction being up to about 100 hours.

2. A process as claimed in claim 1 wherein the tetracycline antibiotic is oxytetracycline and the carbonyl compound is chloral.

3. A process as claimed in claim 1 wherein the tetracycline antibiotic is oxytetracycline and the carbonyl compound is 5-nitrofurfural.

4. A process as claimed in claim 1 wherein the tetracycline antibiotic is oxytetracycline and the carbonyl compound is 2-methyl-3-formylquinoxaline-1,4-dioxide.

5. A process as claimed in claim 1 wherein the tetracycline antibiotic is tetracycline and the carbonyl compound is 5-nitrofurfural.

6. A process as claimed in claim 1 wherein the tetracycline antibiotic is chlortetracycline and the carbonyl compound is chloral.

7. The 1:1 adducts prepared by the process of claim 1.

8. The 1:1 adduct prepared by the process of claim 1 wherein the tetracycline antibiotic is oxytetracycline and the carbonyl compound is 2-methyl-3-formylquinoxaline-1,4-dioxide.

9. The 1:1 adduct prepared by the process of claim 1 wherein the tetracycline antibiotic is tetracycline and the carbonyl compound is 5-nitrofurfural.

10. The 1:1 adduct prepared by the process of claim 1 wherein the tetracycline antibiotic is chlortetracycline and the carbonyl compound is chloral.

References Cited in the file of this patent

UNITED STATES PATENTS

| | | |
|---|---|---|
| 2,734,018 | Minieri | Feb. 7, 1956 |
| 2,736,735 | Michel | Feb. 28, 1956 |

OTHER REFERENCES

Hochstein et al.: J.A.C.S., vol. 75, Nov. 28, 1953, p. 5470.